United States Patent Office 3,173,892
Patented Mar. 16, 1965

3,173,892
PROCESS OF PREPARING REACTION PRODUCTS OF A HALOMETHYLATED CROSS-LINKED COPOLYMER, AND RESULTING PRODUCT
Kenneth A. Kun, Evergreen Park Manor, Pa., assignor to Rohm & Haas Company, Philadelphia, Pa., a corporation of Delaware
No Drawing. Filed May 2, 1962, Ser. No. 191,714
9 Claims. (Cl. 260—47)

This invention concerns polymers which are known as redox polymers inasmuch as they can be reversibly oxidized and reduced. More specifically, it concerns resins which are prepared by reacting a halomethylated cross-linked copolymer with quinones, hydroquinones or lower dialkyl ethers or esters of hydroquinones. When dialkyl ethers of hydroquinones are used, the alkyl groups are subsequently removed from the hydroquinone moiety.

Many of the redox polymers of the prior art exhibited insufficient physical and chemical stability and an object of the present invention is to provide redox polymers which are characterized by high physical and chemical stability.

Many of the prior art cross-linked redox polymers exhibited low capacity and low rates of reactivity. Another object of this invention is to provide redox polymers which have high capacity and high rates of reaction.

Redox polymers are known in the prior art as shown in U.S. Patent 2,703,792, in which it is shown that mixtures of hydroquinone, phenol and formaldehyde, when catalyzed with an acid, such as sulfuric, will react to form condensation resins which can be reversibly oxidized and reduced.

In U.S. Patent 2,700,029, it is shown that vinylhydroquinone can be polymerized by a variety of methods to give polyvinylhydroquinone, which, as indicated hereinbefore, has redox characteristics. U.S. Patent 2,906,376 shows acylated vinylhydroquinones and polymers thereof, said polymers also exhibiting redox characteristics.

Polymers containing redox groups are also set forth in Sansoni, German Patent No. 1,005,734. However, Sansoni's method of preparation is completely different from that of applicant and consists of diazotizing a backbone polymer and subsequently reacting the diazonium salt with thiazine dyes. Sansoni also indicated that quinones and hydroquinones can be used to link to the diazotized polymer chain. In contrast, applicant's process as set forth in detail hereinafter comprises reacting halomethylated cross-linked copolymers with quinones and hydroquinones and alkyl ethers of hydroquinones.

Rao et al. (Chem. Ind. (London), 1961, 145) actually give the details of the use of hydroquinone in the reaction of Sansoni to give a polymeric phenyl quinone-hydroquinone structure. However, the use of the diazonium salt gives additional and uncontrollable cross-linking, and Rao's compound has the same disadvantages as the disadvantages of the Sansoni compound, which disadvantages are set forth hereinafter.

The chemical advantage of the polymeric hydroquinone-quinone structures described in this application as compared to the polymeric phenyl hydroquinone-quinone structure described by Sansoni is a greater reactivity due to increased availability of the reaction sites, and to the increased reactivity of the reaction intermediate. Both structures have styryl units to which the hydroquinone-quinone redox group is attached. Sansoni's material has the redox group attached directly to the phenyl rings of the styryl units while the compounds described in this application have methylene bridges between the aromatic redox group and the styryl unit. These methylene bridges separating the two aromatic rings are directly responsible for the increased reactivity of applicant's compounds as compared to Sansoni's compounds. The biphenyl structure of Sansoni's compounds places the two phenyl rings along a single axis making the hydroxyl group attached ortho to the biphenyl linkage sterically less available for reaction than the hydroxyl group in the meta position to the biphenyl linkage. The compounds described in this case, having a methylene group separating the aromatic groups, positions the two phenyl rings so that they form an angle of approximately 108° to each other at the methylene group. This positioning of the hydroquinonyl group to the styryl unit makes both hydroxyl groups readily available sites. Therefore, applicant's compounds have two sterically available reaction sites while Sansoni's compounds have only one for the initial step in an oxidation reaction. This difference in the number of available reaction sites for applicant's compounds makes it a more reactive material than Sansoni's compounds, to the extent that applicant's compounds react up to twice as fast as Sansoni's compounds. The second advantage of having the two aromatic groups separated by the methylene group is that the reactive semiquinone intermediate of applicant's compounds are not as stable as that of Sansoni's compounds; therefore, the second step of the oxidation is faster for applicant's compounds than for Sansoni's compounds. Semiquinones have resonance stabilization of the single electron by the aromatic ring. The semiquinone of Sansoni's compounds may be stabilized by resonance in the conjugated diphenyl structure whereas the semiquinone of applicant's compounds may be stabilized by resonance in only one aromatic group. The methylene group between the aromatic groups prevents resonance stabilization by the styryl aromatic group. Thus, the semiquinone of applicant's compounds has approximately one-half the resonance stabilization of the semiquinone of Sansoni's compounds and, therefore, the semiquinone of applicant's compounds is a more reactive intermediate than the semiquinone of Sansoni's compounds. The overall rate advantage for applicant's compounds is thereby compounded by virtue of each step being faster.

When the resins of the present invention are in the reduced form, they can be used as polymerization inhibitors for ethylenically unsaturated monomers. When they are in the oxidized form, they can be used, with the appropriate co-reactants, as polymerization catalysts for ethylenically unsaturated monomers.

When in the reduced form, the resins of the present invention are valuable for removing oxygen from water, such water generally being used for boiler feed. The oxygen can be destroyed by sulfites, etc., but by using the resins of the present invention, no foreign substances are added to the water. This is particularly important when boilers are operated at very high pressures.

The halomethylated copolymer is prepared as set forth in U.S. Patent 2,629,710 and the information therein is incorporated herein by reference. The preferred embodiment is a copolymer of styrene and divinylbenzene, in which the divinylbenzene content can be from 1 to 55% of the total monomer mixture. While such copolymers are particularly advantageous from the standpoint of economy and availability, other monoethylenically unsaturated monomers may be substituted for all or part of the styrene. Thus, vinyl toluene, α-methylstyrene, and vinyl naphthalene can be substituted for the styrene. Part of the styrene may be replaced with alkyl esters of acrylic or methacrylic acid.

Cross-linkers other than divinylbenzene, such as divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, polyvinyl or polyallyl ethers of glycol, of glycerol, of pentaerythritol, of mono- or dithio-derivatives of glycols, and of resorcinol; divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N' - methylenediamethacrylamide, N,N' - methylenediacrylamide, N,N' - methylenedimethacrylamide, N,N'-ethylenediacrylamide, 1,2-bis(α-methylmethylene sulfonamido)ethylene, trivinylbenzene, trivinylnaphthalene, and polyvinylanthracenes, can also be employed. These cross-linkers generally constitute from 1% to 55% of the monomer mixture.

Particularly preferred types of polymers are those which possess what is now known as a macroreticular structure. While it is frequently stated that all gel ion exchange resins have micropores, the important porosity in the macroreticular-structured resin is not contributed by such micropores. It is macroporous in the true sense and is characterized by high specific surface. With the convention or so-called gel type resins, the specific surface as measured by the Brunauer, Emmett and Teller method is always less than 1 sq. m./g., and is limited to the surface derived from the geometry of the particles. With the resins which possess macroreticular structure, the specific surface, also measured by the Brunauer, Emmett and Teller method, is always in excess of 1 sq. m./g. and can be as high as 300 sq. m./g. The specific surface value depends on several variables and is proportional to the amount of cross-linker and the amount of "precipitant" (described hereinafter) which is employed; the highest values for specific surface are obtained at high cross-linker and high "precipitant" contents.

These resins are prepared by polymerizing a mixture of a monoethylenically unsaturated monomer and a polyethylenically unsaturated monomer in the presence of a substance, designated the "precipitant," which is a solvent for the monomer mixture, but does not swell nor is imbibed by the cross-linked polymer so formed. As the copolymerization reaction proceeds and the amount of monomer in the mixture decreases, it is postulated that the added liquid, not being able to dissolve in the copolymer, forms minute channels of liquid within the overall solid particle. When the copolymerization is complete and the liquid is removed, the particle has true macroporosity as shown by the measurement of its specific surface.

Compounds which can cause this macroreticular structure in monovinylaromatic-polyvinylaromatic monomer mixtures include alkanols with a carbon content of from 4 to 10, such as n-butanol, t-amyl alcohol and decanol. Higher saturated aliphatic hydrocarbons, such as heptane and isooctane also give the desired effect when used in amounts sufficient to cause phase separation. A typical preparation of a macroreticular-structured resin is as follows:

A mixture of styrene (121.6 grams) technical divinylbenzene (38.4 grams containing 50% active ingredient), 87 grams of tert-amyl alcohol and 1 gram of benzoyl peroxide was charged to a solution of 6.5 grams of sodium chloride and 0.5 gram of the ammonium salt of a commercial styrene-maleic anhydride copolymer in 174 grams of water. The mixture was agitated until the organic components were dispersed as fine droplets and then heated to 86° to 88° C. for six hours.

The resultant polymer pearls were filtered and washed with water and freed from excess water and amyl alcohol by drying at elevated temperature. The product was obtained in the form of white opaque spherical or spheroidal particles amounting to 145 grams. When the dried product was dropped into a fluid such as hexane, fine bubbles were seen to rise from the immersed particles due to displacement of air held within the void spaces of the resin by the organic fluid.

In the absence of this material which causes phase separation, the so-called conventional copolymers are obtained which do not have the macroreticular structure and which have very low specific surface. Such copolymers, when halomethylated, can be reacted with dialkyl ethers of hydroquinones or with quinones or with hydroquinones to form redox polymers.

That the structure of these conventional resins is markedly different from the macroreticular-structured redox polymers is evident from the rate of reaction with, for instance, an iodine solution. Two resins, one prepared using a styrene-3% divinylbenzene backbone copolymer in the conventional fashion, and the other prepared with a macroreticular structure and being a styrene-3% divinylbenzene, which copolymer was prepared in the presence of 46.5% tert-amyl alcohol, were converted to redox polymers by the process of the present invention. Both had an ultimate redox capacity of 5.0 meq./g. of resin, but when the macroreticular-structured redox polymer was placed in an aqueous iodine solution, it reduced 3.0 meq. in 15 minutes of contact, 4.0 meq. in one hour and 4.2 meq. in two hours. In contrast to this, the redox polymer based on the conventional gel shows no appreciable reaction in the first one-half hour contact and reduces 0.6 meq./g. in one hour, 1.1 meq. in two hours, and only reaches 4.0 meq./g. after 24 hours. This and other experiments clearly show a markedly faster rate of reaction from the macroreticular-structured redox copolymers, which represent the preferred embodiment of this invention.

The copolymers are halomethylated by treatment with halomethyl ether and aluminum chloride, generally in a swelling solvent, such as ethylene dichloride. Whereas bromomethyl ether can be employed as the halomethylating agent, chloromethyl ether is preferred because of availability and economy. The halomethylated copolymer is then reacted wtih a dialkoxybenzene (such as hydroquinone dimethyl ether), preferably in a solvent which will swell the halomethylated beads, ethylene dichloride being typical. The dimethyl adduct is then cleaved with an agent such as hydrogen iodide to give the hydroquinone. Whereas other para-dialkoxybenzenes can be used, the demethoxy compound is preferred since it is available and lower in cost than the other members of the series. Since the dialkoxy group is not present in the final product, the particular group used is not important from a chemical standpoint.

It is necessary that catalysts be used to effect the reaction of either quinones, hydroquinones, or the dialkyl ethers of hydroquinones, and any Friedel-Crafts reagents, frequently known as Lewis acids, will function. Typical of these are zinc chloride, stannic chloride, aluminum chloride, ferric chloride and boron trifluoride. Zinc chloride represents the preferred catalyst. The amount used is not critical, from about 0.5% on the weight of the reactants to about 5% on the weight of the reactants has been found to be adequate.

The reaction temperature can vary from 5° C. to 100° C. and it is frequently convenient to run at reflux temperature. Thus, using ethylene dichloride as solvent, the reaction temperature is about 90° C. A preferred range is from about 50° C. to 90° C.

When the redox polymers of the present invention are to be used in non-aqueous media, it is preferred that substantially all of the halomethyl groups on the polymer chain are reacted with benzoquinone, hydroquinone or dialkyl ethers of hydroquinones. This results in the highest oxidation-reduction capacity but the redox polymer so formed tends to be hydrophobic because of the nature of the groups attached thereto.

When it is desired to use the redox polymers in aqueous or highly polar media, then it is often desirable to introduce some polar groups into the polymer chain in order to increase the hydrophilicity or wetting characteristics of the polymer, and also to make it swellable in water and other polar solvents.

Polar groups can be introduced by reacting only part of the halomethyl groups on the polymer with quinones or hydroquinones or dialkyl ethers or esters thereof. The remaining halomethyl groups can then be aminated in the usual fashion with a primary, secondary, or tertiary amine. The resulting polymer not only shows redox properties, but it is also more easily wetted and swollen by water and other polar solvents. In addition, it has anion exchange capacity, and functions as a combination redox-anion exchange resin. From 3 to 50% of the halomethyl groups on the polymer backbone can be aminated, thus giving a variable and controllable ratio between ratio between the reduction-oxidation capacity of the resin and the anion exchange capacity.

In a like manner, by leaving some of the halomethyl groups available for further reaction, it is possible to introduce other polar groups into the polymer chain. Thus, the halomethyl groups remaining can be reacted with glycolic acid to form a redox polymer with carboxylic cation exchange activity. The presence of the carboxylic group also increases the wetting and swelling properties of the resin in polar liquids such as water.

In the case of the redox resins which possess anion or carboxylic activity, and depending on the composition of the surrounding medium in which it is being used, it is possible that the pH of the medium will be altered, thus altering the oxidation-reduction potential of the redox group.

While for the purposes of illustration hereinbefore, we have referred to benzoquinone and the dialkyl ethers of hydroquinone as the reagents adding to the chloromethylated backbone polymer, actually there are a large number of quinones, hydroquinones and quinone derivatives which function satisfactorily. Thus, both the ortho and para-benzoquinones and alkyl and halogen-substituted modifications are reactive as long as there is one hydrogen in the ring available for reaction with the chloromethyl group. This means the mono-, di- and tri-substituted benzoquinones can be employed. Alpha- and β-naphthoquinones can also be employed and again can be extensively substituted with alkyl and halogen groups as long as there is one hydrogen on an aromatic ring available for substitution. Anthraquinones and substituted anthraquinones can also be employed in the process of the present invention with the limitation that there must be one hydrogen in an aromatic ring which is available for substitution.

The hydroquinones corresponding to the above-noted quinones are also satisfactory and it is sometimes desirable to protect the hydroxyl groups during the reaction by employing the dialkyl ethers or the dialkyl esters. The dibenzoates of these hydroquinones can also be employed, the two benzoyl radicals being cleaved after the addition to the polymer chain.

Typical of the quinones which can be used are the following: toluquinone, 2,3-dimethylbenzoquinone, 2,5-dimethylbenzoquinone, 2,6-dimethylbenzoquinone, 2,3,5-trimethylbenzoquinone, 2,5-diethylbenzoquinone, 2,6-diethylbenzoquinone, 2,5-diphenylbenzoquinone, 2,6-diphenylbenzoquinone, 5-tert-butylbenzoquinone, n-amylbenzoquinone, dodecylbenzoquinones, ethylbenzoquinones, 5-ethyltoluquinone, 6-ethyltoluquinone, 5-ethyl-p-xyloquinone, hexadecylquinones, isopropylquinones, phenylquinones, n-propylquinones, 5-propyltoluquinones, fluoroquinones, chloroquinones, bromoquinones, 2,3-dichloroquinone, anthraquinones, 1-bromoanthraquinones, 2-bromoanthraquinone, 1-chloroanthraquinone, 2-chloroanthraquinone, 2,7-dichloroanthraquinone, 2,7-dibromoanthraquinone, 2-methylanthraquinone, 2-ethylanthraquinone, 1-aminoanthraquinone, phenanthraquinone, 2-methyl-1-nitroanthraquinone, 4-bromo-1-methylaminoanthraquinone, 1-amino-4-hydroxyanthraquinone, 1,2-dihydroxyanthraquinone, 1,2-naphthoquinone, 1,4-naphthoquinone, 2-methylnaphthoquinone, 2-aminonaphthoquinone, and mixtures thereof.

The hydroquinones corresponding to the quinones set forth in the preceding paragraph may also be used.

Thus, it is seen that this addition to chloromethylated polymer backbone chains is broadly applicable to a wide variety of quinones, hydroquinones and the substituted compounds corresponding thereto. It is also clear that the hydroquinones may be in the form of alkyl ethers or alkyl esters or an aromatic ester, such as benzoate.

The redox polymers of the present invention, particularly the preferred macroreticular-structured embodiments, are characterized by outstanding chemical and physical resistance. They can undergo repeated oxidation-reduction cycles without deterioration of their physical or chemical properties. That this is true is shown by the following test:

A sample of the cleaved dimethoxybenzene adduct on a chloromethylated macroreticular-structured styrene-divinylbenzene copolymer containing 3% divinylbenzene was evaluated for mechanical stability by use of a microcycler with an aqueous iodine solution as the oxidant and a sodium hydrosulfite solution as the reductant. For a period of approximately 140 hours, the beads were recycled slightly more than two thousand times. A complete cycle ran for approximately four and one-half minutes and consisted of the following steps:

(1) Addition of deionized water, enough to cover beads completely;
(2) Vacuum filtration to remove all water;
(3) Addition of iodine solution, enough to cover beads completely;
(4) Vacuum filtration to remove iodine solution;
(5) Addition of deionized water to wash beads free of residual iodine solution;
(6) Vacuum filtration to remove wash water;
(7) Addition of aqueous sodium hydrosulfite;
(8) Vacuum filtration to remove hydrosulfite solution.
Repeat cycle, starting at No. 1.

The initial and final weights of the dry resin in the reduced form were within three milligrams of each other, i.e. starting weight: 2.0011 g.; final weight: 2.0032 g. As observed by microscopic examination, the beads did not powder, crack or split during the series of oxidation-reduction cycles.

The oxidized form of the redox resins of the present invention, i.e. the quinone form, is easily reduced by treatment with a reducing agent such as 10% aqueous sodium bisulfite. Sodium thiosulfate may also be used. The reduced, or hydroquinone form of these redox resins, can be readily oxidized to the quinone form by treatment with the solutions of such oxidizing agents as iodine, ceric chloride or ceric sulfate, ferric sulfate, potassium permangate, etc.

The interconvertibility of the two forms of redox resins is well-known in the art, and does not constitute the present invention.

The redox capacities given in the following examples are determined by determining the amount of iodine which is reduced by the hydroquinone form of the resin. The capacities are expressed in millequivalents per iodine reduced per gram (dry weight) of resin.

The redox polymers in Examples I to VII were prepared using a "conventional" backbone copolymer. These copolymers were prepared by suspension copolymerizing a mixture of styrene and divinylbenzene without the use of a liquid which is a solvent for the monomer mixture and which is not imbibed, nor will it swell, the copolymer so produced.

Examples VIII to XXXII were prepared by using a copolymer which had a macroreticular structure, and which were prepared by copolymerizing a mixture of styrene and divinylbenzene in the presence of a liquid which was a solvent for the monomer mixture, and which would not swell or be imbibed by the copolymer. The preparation of typical macroreticular-structured copolymers is set forth in detail hereinbefore. These macroreticular-structured copolymers are characterized by high porosity and high specific surface, and the redox polymers based thereon represent the preferred embodiment of this invention. Because of their high specific surface, they are characterized by rapid reaction rates and high capacities.

The surface area of the macroreticular redox resins described in this invention is from at least 10 to 500 times greater than that of typical gel-type resins described in the prior art. Since the rates of reaction are diffusion dependent and the rate of diffusion is proportional to the surface area, the rates of diffusion are proportional to the surface area. The rate of reaction of the macroreticular resins are from at least 10 to 500 times greater than those of typical gel-type resins.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted:

*Example I*

To a one-liter, three-neck round bottom flask, fitted with a stirrer, reflux condenser and thermometer is added 152.6 grams of chloromethylated poly(styrene-divinylbenzene) prepared from a styrene-divinylbenzene copolymer containing 3% divinylbenzene, by conventional methods, by chloromethylation with chloromethyl ether. It contained 21.7% chlorine. Two hundred ml. of ethylene dichloride and 152.0 grams of p-dimethoxybenzene are added to the chloromethylated polymer beads. The mixture is stirred for several minutes and 2.7 grams of zinc chloride (freshly fused powder) is added. The reaction mixture is heated with continuous stirring, at reflux temperature, 90° C., for twenty-four hours. At the beginning of the heating period, the beads take on a dark brown color and retain this color throughout the entire reflux period. Hydrogen chloride is given off during the reaction. At the end of the reflux period, the ethylene dichloride is drained off. The beads are washed in ethylene dichloride and then washed with water. The beads now lose the brown appearance they had through the reflux period and are again tan in color. To insure the removal of unreacted p-dimethoxybenzene, a steam distillation is employed to remove all residual volatile impurities from the beads. The dried reaction product contained 17.3% methoxyl, 1.57% residual chloride and 1.44% ash. Cleavage of the protecting ether groups may be run on the dried beads or directly on the wet beads after draining the water from the steam distillation. To the beads, 300 grams of 47% hydriodic acid is added. This mixture is stirred and heated at reflux temperature, 110° C., for sixteen hours. The beads are drained, washed with water until the washings are neutral to pH paper, and dried to constant weight. This reaction gave 196.6 grams of cross-linked poly(vinylbenzylhydroquinone) redox polymer. The redox capacity was 4.2 meq./g.

*Example II*

Procedure according to Example I with the exception that the dimethoxybenzene is reacted with the chloromethylated poly(styrene-divinylbenzene) beads at room temperature for 24 hours. The dried reaction product yields 187 grams of material intermediate containing 11.85% methoxyl, 4.85% residual chloride, and 0.43% ash. It was cleaved with HI as in Example I, and had a redox capacity of 3.1 meq./g.

*Example III*

To a one-liter three-neck round bottom flask, fitted with a stirrer, reflux condenser and thermometer is added 50.0 grams of chloromethylated poly(styrene-divinylbenzene) beads (containing 3% divinylbenzene and prepared by chloromethylation with chloromethyl ether) to a solution of 55.0 grams of 2,5-dimethoxytoluene in 100 ml. of ethylene dichloride and the mixture is stirred for one-half hour at room temperature. One gram of zinc chloride dissolved in three ml. of ethylene dichloride is added. With continuous stirring, the reaction mixture is refluxed for twenty-four hours at 92° C. At the end of the reflux period, the ethylene dichloride is drained off. The beads are washed in ethylene dichloride and then washed with water. The beads now lose the brown appearance they had during the reaction and are again tan. To insure the removal of unreacted dimethoxytoluene, a steam distillation is emloyed to remove all residual volatile impurities from the beads. The dried reaction product contained 15.60% methoxyl and less than 1% ash. Clevage of the protecting ether groups may be run on the dried beads or directly on the wet beads after draining the water from the steam distillation. To the beads, 300 grams of 47% hydriodic acid is added. This mixture is stirred and heated at reflux temperature, 110° C., for sixteen hours. The beads are drained of acid, washed with water until the washings are neutral to pH paper and dried to constant weight. They were cleaved with hydrogen iodide as in Example I and had a redox capacity of 2.9 meq./g.

*Example IV*

To a one-liter three-neck round bottom flask, fitted with a stirrer, reflux condenser and thermometer is added 50 grams of chloromethylated poly(styrene-divinylbenzene) beads containing 3% divinylbenzene with 80 grams of p-benzoquinone in 325 ml. of ethylene dichloride. One gram of zinc chloride is added. With continuous stirring the reaction mixture is refluxed for eighteen hours at 92° C. At the end of the reflux period the ethylene dichloride is drained off. The beads are washed in ethylene dichloride and then washed with water. To insure the removal of unreacted p-benzoquinone and the remaining ethylene dichloride, a steam distillation is employed to remove all residual volatile impurities from the beads. The product, a mixture of cross-linked poly(vinylbenzylhydroquinone) and cross-linked poly(vinylbenzylbenzoquinone), is isolated by filtration and dried to constant weight. Treatment of the mixture with oxidizing agents gives poly(vinylbenzylbenzoquinone), while treatment with a reducing agent gives poly(vinylbenzylhydroquinone). This reaction gave 82.5 grams of material. The redox capacity was 2.8 meq./g.

*Example V*

Procedure according to Example IV with the exception that the p-benzoquinone was reacted with the chloromethylated beads for only four hours at room temperature. The dried reaction product yields 64.0 grams of material having a redox capacity of 0.9 meq./g.

*Example VI*

Procedure according to Example IV with the exception that aluminum chloride was used as the catalyst instead of zinc chloride. This reaction gave 44.0 grams of product. The redox capacity was 2.6 meq./g.

*Example VII*

Procedure according to Example IV with the exception that ferric chloride was used as the catalyst instead of zinc chloride. This reaction gave 63.0 grams of product. The redox capacity was 2.3 meq./g.

*Example VIII*

To a two-liter, three-neck round bottom flask fitted with a stirrer, reflux condenser and thermometer, was added 75.0 grams of a macroreticular-structured chloromethylated poly(styrene-divinylbenzene) prepared from a styrene-divinylbenzene copolymer containing 3% divinylbenzene by chloromethylation with chloromethyl ether. It contained 20.65% chloride, had a surface area of 8.0 m.²/g. and a porosity of 36%. A solution of 100 grams of 2,5-dimethylbenzoquinone in 375 ml. of ethylene dichloride was added with stirring. When the beads were completely solvated, 1.90 grams of zinc chloride was added. The reaction mixture was heated to reflux, then stirring and refluxing was continued for 24 hours at 81° C. After cooling the reaction mixture, the ethylene dichloride solution was drained off and the beads were washed three times with fresh ethylene dichloride. Last traces of ethylene dichloride and benzoquinone were removed by steam distillation. Distillation was continued until a colorless aqueous distillate was obtained for a period of one-half hour. Non-volatile impurities were removed by extracting the beads with hot ethanol for 8 hours in a Soxhlet extractor. Product was dried to constant weight at 80° C.

Analytical results for this preparation showed the product to have a redox capacity of 4.3 meq./g.

Example IX

Procedure according to Example VIII with the exception that 58.0 grams of 2,3,5-trimethylbenzoquinone in 190 ml. of ethylene dichloride was added to 62.0 grams of the above-described beads with 1.80 grams of zinc chloride catalyst.

Analytical results for this preparation showed the product to have a redox capacity of 3.9 meq./g.

Example X

Procedure according to Example VIII with the exception that 122.0 grams of 2-methyl anthraquinone in 457 ml. of ethylene dichloride was added to 75.0 grams of the above-described beads with 1.90 grams of zinc chloride catalyst. The redox capacity of this material was 2.9 meq./g.

Example XI

To a two-liter, three neck, round-bottom flask fitted with a stirrer, reflux condenser and thermometer, was added 75.0 grams of macroreticular-structured chloromethylated poly(styrene-divinylbenzene) prepared from a styrene-divinylbenzene copolymer containing 20% divinylbenzene by chloromethylation with chloromethyl ether. It contained 13.07% chloride, had a surface area of 60.3 m.²/g. and a porosity of 38%. The preparation was run exactly like Example VIII. The redox capacity of this material was 3.2 meq./g.

Example XII

Procedure according to Example VIII with the exception that 122.0 grams of 2-methylanthraquinone in 373 ml. of ethylene dichloride was added to 75.0 grams of the above-described beads with 1.90 grams of zinc chloride catalyst. The redox capacity of this material was 2.6 meq./g.

Example XIII

To a five hundred milliliter, three-neck round-bottom flask fitted with a stirrer, reflux condenser and thermometer, was added 30 grams of chloromethylated poly(styrene-divinylbenzene) prepared from a styrene-divinylbenzene copolymer containing 3% divinylbenzene by chloromethylation with chloromethyl ether. It contained 20.23% chloride, had a porosity of 51% and a surface area of 25 m.²/g. Hydroquinone (50 grams), 1.0 gram of zinc chloride and 200 ml. of dioxane were added to the beads and the resulting mixture was heated at reflux, with constant stirring, for sixteen hours. After cooling the reaction mixture, the dioxane solution was removed by filtration and the beads were washed with water followed by a methanol wash. The drained beads were washed for 4 hours with hot ethanol in a Soxhlet extractor to remove the last traces of unreacted hydroquinone. Product was dried to constant weight at 120° C. to yield a material having a redox capacity of 6.0 meq./g. and contained 82.27% C, 6.44% H, 1.51% residual chloride and no ash.

Example XIV

Procedure according to Example VIII with the exception that 40 grams of benzoquinone and 250 ml. of ethylene dichloride was added to 30 grams of chloromethylated polystyrene-divinylbenzene prepared from a styrene-divinylbenzene copolymer containing 50% divinylbenzene. It contained 10.66% chloride, had a porosity of 30% and a surface area of 250 sq. m./g. The catalyst used was 1.36 grams of fused zinc chloride. Analytical results for this preparation showed the product to have 77.05% C, 6.37% H, 4.35% residual chloride, and 0.29% ash.

Example XV

The procedure according to Example I with the exception that 40 grams of dimethoxybenzene and 250 ml. of ethylene dichloride was added to 30 grams of the above-described beads with 1.36 grams zinc chloride. The dried reaction intermediate contained 81.37% C, 7.44% H, 4.37% residual chloride, 4.59% methoxyl and 0.45% ash. The methoxyl groups were cleaved with 47% hydriodic acid as described in Example I.

Example XVI

The procedure according to Example XIII with the exception that 40 grams hydroquinone and 250 ml. of dioxane was added to 30 grams of the above-described beads with 1.36 grams zinc chloride. The redox capacity of the final product was 3.7 meq./g.

Example XVII

The procedure according to Example I using a chloromethylated polystyrene-divinylbenzene prepared from a styrene-divinylbenzene copolymer containing 20% divinylbenzene. The chloromethylated copolymer contained 14.90% C, had a surface area of 45 sq. m./g., and a porosity of 45%. The dried reaction intermediate contained 9.48% methoxyl, 3.21% residual chloride and no ash. Methoxyl groups were cleaved with 47% hydriodic acid as described in Example I. The redox capacity of the final product was 2.8 meq./g.

Example XVIII

The procedure according to Example VIII with the exception that the chloromethylated beads described in Example XVII were used. The final product contained 79.89% C, 6.56% H, 8.25% residual chloride, 0.16% ash, and 17.3% benzoquinone adduct.

Example XIX

The procedure according to Example XIII with the exception that the chloromethylated beads described in Example XVII were used. The redox capacity of the final product was 2.5 meq./g.

Example XX

The procedure according to Example I using a chloromethylated polystyrene-divinylbenzene prepared from a styrene-divinylbenzene copolymer containing 20% divinylbenzene. The chloromethylated copolymer contained 12.5% chloride, had a surface area of 80 sq. m./g. and a porosity of 30%. The dried reaction intermediate contained 8.78% methoxyl, 2.37% residual chloride and 0.45% ash. Methoxyl groups were cleaved with 47% hydriodic acid as described in Example I. The redox capacity of the final product is 2.6 meq./g.

Example XXI

The procedure according to Example VIII with the exception that the chloromethylated beads described in Example XX were used. The final product contained 80.04% C, 6.31% H, 5.20% residual chloride, no ash and 28.2% benzoquinone adduct.

*Example XXII*

The procedure according to Example XIII with the exception that the chloromethylated beads described in Example XX were used. The redox capacity of the final product was 2.3 meq./g.

*Example XXIII*

The procedure according to Example I using the chloromethylated polystyrene-divinylbenzene described in Example VIII. The dried reaction intermediate contained 18.6% methoxyl, 0.80% residual chloride and 0.39% ash. Methoxyl groups were cleaved with 47% hydriodic acid as in Example I. The redox capacity of the final product was 4.8 meq./g.

*Example XXIV*

The procedure according to Example VIII with the exception that 80 grams of benzoquinone in 325 ml. of ethylene dichloride was used. Analytical results for this preparation showed the product to have 74.50% C, 5.62% H, 6.27% residual chloride, no ash, and 45.6% benzoquinone adduct.

*Example XXV*

A mixture of 182.4 grams of styrene, 27.8 grams of trivinylbenzene (containing 97.3% active ingredient), 130.5 grams of t-amyl alcohol and 2.0 grams of benzoyl peroxide are charged to a solution of 9.8 grams of sodium chloride and 0.8 gram of the ammonium salt of a commercial styrene-maleic anhydride copolymer in 261 grams of water. The mixture was agitated until the organic components were dispersed as fine droplets and then heated to 86° to 88° C. for 6 hours. The resultant polymer beads were filtered and washed with water and freed from excess water and amyl alcohol by drying at elevated temperature. The product was obtained in the form of white opaque spherical particles weighing 189.2 grams. This copolymer is chloromethylated as described in U.S. Patent 2,629,710.

*Example XXVI*

The procedure according to Example XXV with the exception that the reacting monomers used are 137.8 grams of vinyl toluene and 88.7 grams of ethylene glycol dimethacrylate.

*Example XXVII*

The procedure according to Example XXV with the exception that the reacting monomers used are 129.8 grams of α-methylstyrene and 215.9 grams of diallyl maleate.

*Example XXVIII*

The procedure according to Example XXV with the exception that the reacting monomers used are 198.3 grams of vinyl naphthalene and 38.4 grams of divinylbenzene (containing 50.3% active ingredient).

*Example XXIX*

The procedure according to Example IV using the chloromethylated poly(styrene-trivinylbenzene) described in Example XXV. It has 12.30% chloride. The redox capacity of the reaction product is 1.9 meq./g.

*Example XXX*

The procedure according to Example IV using the chloromethylated poly(vinyl toluene ethyleneglycol dimethacrylate) described in Example XXVI. It has 9.78% chloride. The redox capacity of the reaction product is 2.3 meq./g.

*Example XXXI*

The procedure according to Example IV using the chloromethylated poly(α-methylstyrene diallyl maleate) described in Example XXVII. It has 12.78% chloride. The redox capacity of the reaction product is 2.5 meq./g.

*Example XXXII*

The procedure according to Example IV using the chloromethylated poly(vinylnaphthalene divinylbenzene) described in Example I. It has 9.0% chloride. The redox capacity of the reaction product is 1.3 meq./g.

I claim:
1. A process for the preparation of polymers which comprises reacting in the presence of a Friedel-Crafts catalyst:
   (A) a non-fluorinated halomethylated cross-linked copolymer containing arylene nuclei containing 1 to 4 aromatic rings with
   (B) compounds selected from the group consisting of benzoquinones, naphthoquinones, anthraquinones, and hydroquinones corresponding to the hereinbefore noted quinones, the lower dialkyl ethers of these hydroquinones and the diallyl and diaryl diesters of these hydroquinones, each of said compounds having at least one hydrogen in an aromatic ring available for substitution,
   (C) the cross-linker in said copolymer having been selected from the group consisting of divinylbenzene, divinylpyridine, divinyltoluene, divinylnaphthalene, diallyl phthalate, ethylene glycol diacrylate, ethylene glycol dimethacrylate, divinylxylene, divinylethylbenzene, divinylsulfone, polyvinyl ether of glycol, polyallyl ether of glycol, polyvinyl ether of glycerol, polyallyl ether of glycerol, polyvinyl ether of pentaerythritol, polyallyl ether of pentaerythritol, polyvinyl ether of mono derivatives of glycol, polyallyl ether of mono derivatives of glycol, polyvinyl ether of mono derivatives of glycol, polyallyl ether of mono derivatives of glycol, polyvinyl ether of resorcinol, polyallyl ether of resorcinol, divinylketone, divinyl sulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylene-diacrylamide, N,N'-methylenedimethacrylamide, N,N'-methylenediacrylamide, N,N' - methylenedimethacrylamide, N,N' - ethylenediacrylamide, 1,2 - bis(α-methylmethylene sulfonamido)ethylene, trivinylbenzene, trivinylnaphthalene, and polyvinylanthracene.

2. A process as set forth in claim 1 in which the cross-linked copolymer is a copolymer of the cross-linker and a monomer selected from the group consisting of styrene, α-methylstyrene, vinyltoluene and vinyl naphthalene.

3. A process as set forth in claim 1 in which the reaction temperature is from 5° C. to 100° C.

4. A process as set forth in claim 1 in which the Friedel-Crafts catalyst is zinc chloride.

5. A process for the preparation of redox polymers which comprises reacting a non-fluorinated, halomethylated cross-linked copolymer containing arylene nuclei with lower dialkyl esters of hydroquinone in the presence of a Friedel-Crafts catalyst, and subsequently replacing the lower dialkyl groups with hydrogens.

6. Processes for the preparation of polymers which comprises reacting in the presence of a Friedel-Crafts catalyst
   (A) a non-fluorinated, halomethylated cross-linked copolymer containing arylene nuclei containing 1 to 4 aromatic rings, said copolymer possessing a macroreticular structure, with
   (B) compounds selected from the group consisting of benzoquinones, naphthoquinones, anthraquinones and hydroquinones corresponding to the hereinbefore noted quinones, the lower dialkyl ethers of these hydroquinones and the diallyl and diaryl diesters of these hydroquinones, each of said compounds having at least one hydrogen in an aromatic ring available for substitution.

7. A process as set forth in claim 6 in which the cross-linked copolymer having a macroreticular structure is a styrene-divinylbenzene copolymer.

8. Cross-linked poly(vinylbenzylhydroquinone) having as its basic recurring unit the structure:

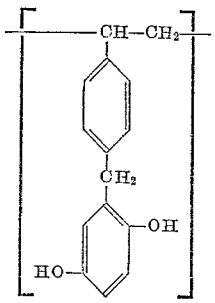

9. Cross-linked poly(vinylbenzylbenzoquinone) having as its basic recurring unit the structure:

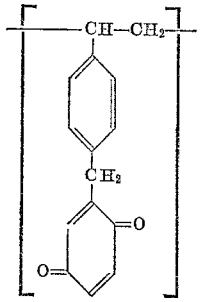

References Cited by the Examiner

Rao: Chemistry and Industry (London), page 145, Feb. 4, 1961.

Ezrin: J.A.C.S., vol. 75, pages 1610–1614, Apr. 5, 1953.

WILLIAM H. SHORT, *Primary Examiner*.